United States Patent
Bifulco et al.

(10) Patent No.: US 10,432,511 B2
(45) Date of Patent: Oct. 1, 2019

(54) METHOD FOR FORWARDING DATA IN A NETWORK, FORWARDING ELEMENT FOR FORWARDING DATA, AND A NETWORK FOR FORWARDING DATA

(71) Applicant: NEC Europe Ltd., Heidelberg (DE)

(72) Inventors: Roberto Bifulco, Heidelberg (DE); Ghassan Karame, Heidelberg (DE); Felix Klaedtke, Heidelberg (DE); Heng Cui, Berlin (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/554,431

(22) PCT Filed: Mar. 12, 2015

(86) PCT No.: PCT/EP2015/055227
§ 371 (c)(1),
(2) Date: Aug. 30, 2017

(87) PCT Pub. No.: WO2016/141996
PCT Pub. Date: Sep. 15, 2016

(65) Prior Publication Data
US 2018/0048561 A1    Feb. 15, 2018

(51) Int. Cl.
*H04W 4/00* (2018.01)
*H04L 12/721* (2013.01)
(Continued)

(52) U.S. Cl.
CPC .............. *H04L 45/38* (2013.01); *G06F 21/75* (2013.01); *H04L 41/0893* (2013.01);
(Continued)

(58) Field of Classification Search
None
See application file for complete search history.

(56) References Cited

U.S. PATENT DOCUMENTS

| 6,463,068 | B1* | 10/2002 | Lin | H04L 45/00 370/230 |
| 9,379,981 | B1* | 6/2016 | Zhou | H04L 47/125 |
| 2005/0050060 | A1* | 3/2005 | Damm | H04L 45/00 |

(Continued)

OTHER PUBLICATIONS

Wasserman S Hartman Painless Security D Zhang Huawei M: "Security Analysis of the Open Networking Foundation (ONF) OpenFlow Switch Specification; draft-mrw-sdnsec-openflow-analysis-01.txt", Security Analysis of the Open Networking Foundation (ONF) Openflow Switch Specification; Draft-MRW-SDNSEC-OPENFLOW-ANALYSIS-01.TXT, Internet Engineering Task Force, IETF; Standardworking Draft, Internet Society (ISOC) 4, Rue Des Falaises CH-1205 Gene, Apr. 17, 2013 (Apr. 17, 2013), pp. 1-7, XP015091451.

*Primary Examiner* — Farah Faroul
(74) *Attorney, Agent, or Firm* — Leydig, Voit & Mayer, Ltd.

(57) ABSTRACT

A method for forwarding data flows in a network, which has a forwarding element for forwarding the data flows, includes: receiving a data flow of the data flows, the data flow corresponding to a present forwarding rule of the forwarding element; forwarding the data flow with an added time delay. The added time delay includes a first forwarding time delay and second forwarding time delay. A first number of packets of the data flow, which are first packets, are forwarded by the first forwarding element with the first forwarding time delay. A second number of the packets of the data flow, which are second packets, are forwarded with the second forwarding time delay. The first forwarding time delay and the second forwarding time delay have a time difference from each other.

15 Claims, 2 Drawing Sheets

(51) Int. Cl.
*G06F 21/75* (2013.01)
*H04L 12/715* (2013.01)
*H04L 12/823* (2013.01)
*H04L 12/26* (2006.01)
*H04L 29/06* (2006.01)
*H04L 12/24* (2006.01)
*H04L 12/803* (2013.01)

(52) U.S. Cl.
CPC .......... *H04L 43/0852* (2013.01); *H04L 45/64* (2013.01); *H04L 47/32* (2013.01); *H04L 63/1475* (2013.01); *H04L 63/1491* (2013.01); *H04L 47/125* (2013.01)

(56) References Cited

U.S. PATENT DOCUMENTS

| | | | |
|---|---|---|---|
| 2006/0101513 A1 | 5/2006 | Gammel et al. | |
| 2007/0174344 A1* | 7/2007 | Goh | G06F 1/3203 |
| 2008/0119180 A1 | 5/2008 | Small et al. | |
| 2008/0228932 A1* | 9/2008 | Monette | H04L 47/10 709/229 |
| 2009/0262659 A1* | 10/2009 | Sturges | H04L 63/0263 370/253 |
| 2009/0271857 A1* | 10/2009 | Wang | H04L 47/2441 726/11 |
| 2010/0191697 A1* | 7/2010 | Fukumoto | A61B 5/1116 706/54 |
| 2011/0122885 A1* | 5/2011 | Hedman | H04L 65/1016 370/412 |
| 2012/0151589 A1* | 6/2012 | Hershey | H04L 63/1416 726/24 |
| 2013/0136117 A1* | 5/2013 | Schrum, Jr. | H04W 88/06 370/338 |
| 2013/0258898 A1* | 10/2013 | Gao | H04L 49/555 370/252 |
| 2013/0322440 A1* | 12/2013 | Chiba | H04L 49/3009 370/389 |
| 2014/0098669 A1* | 4/2014 | Garg | H04L 47/12 370/235 |
| 2014/0341019 A1* | 11/2014 | Yamagata | H04L 47/32 370/230 |
| 2015/0009830 A1* | 1/2015 | Bisht | H04L 47/125 370/236 |
| 2015/0163144 A1* | 6/2015 | Koponen | H04L 47/125 370/237 |
| 2015/0256465 A1* | 9/2015 | Mack-Crane | H04L 41/12 709/232 |
| 2016/0028604 A1* | 1/2016 | Chakrabarti | H04L 43/0852 370/252 |
| 2016/0050117 A1* | 2/2016 | Voellmy | H04L 12/6418 370/392 |
| 2016/0191406 A1* | 6/2016 | Xiao | H04L 12/6418 370/235 |
| 2017/0005937 A1* | 1/2017 | Morita | H04L 43/0864 |
| 2017/0142010 A1* | 5/2017 | Mathew | H04L 12/6418 |

* cited by examiner

METHOD FOR FORWARDING DATA IN A NETWORK, FORWARDING ELEMENT FOR FORWARDING DATA, AND A NETWORK FOR FORWARDING DATA

CROSS REFERENCE TO RELATED APPLICATIONS

This application is a U.S. National Stage Application under 35 U.S.C. § 371 of International Application No. PCT/EP2015/055227 filed on Mar. 12, 2015. The International Application was published in English on Sep. 15, 2016 as WO 2016/141996 A1 under PCT Article 21(2).

FIELD

The present invention relates to a method for forwarding data, preferably data in form of flows, in a network, preferably a software-defined network, wherein the network comprises one or more forwarding elements for forwarding data.

The present invention further relates to a forwarding element for forwarding data, preferably data in form of flows, in a network, and connectable to a delay entity.

The present invention even further relates to a network, preferably a software-defined network, for forwarding data, preferably data in form of flows, in a network, wherein the network comprises one or more forwarding elements for forwarding data.

BACKGROUND

Software Defined Networks 'SDN' enable network administrators to manage network services by abstracting lower-level functionalities of the physical network. This is provided by decoupling the system making decisions about where traffic is sent from the underlying system, e.g. switches, that forwards traffic to the selected destination. Software defined networks require procedures for providing a communication between the so-called control plane and the so-called data plane. Such a procedure providing communication between both planes is e.g. the so-called Open-Flow, which is disclosed in the non-patent literature of the Open Networking Foundation (ONF), OpenFlow Switch Specification, Version 1.3.2, Wire Protocol 0x04, Apr. 25, 2013.

In more detail, when packets of a data flow in the SDN are forwarded this involves only the data plane of a switch: Incoming network packets are matched with flow rules installed at the switches and upon matching are forwarded according to rules' specific actions. However, for some packets, the forwarding happens only after some interaction between the data plane of the switch and control plane. More precisely, a switch can be configured to generate a notification event to the control plane upon reception of packets belonging to specified flows. The control plane answers to said notification by generating a forwarding decision, which is installed in the switch's data plane in the form of a flow rule. When the flow rule is installed, the packet is finally forwarded by the switch.

In a software-defined network, the control plane is usually implemented as a remote entity—the so-called controller—and its invocation significantly delays packet forwarding. These delays are intrinsic in software-defined networks because a) the controller runs on commodity computers and processes the packets in software whereas switches use highly specialized hardware, and
b) installing flow rules in the switches' flow tables is a costly operation.

By monitoring the network traffic, an attacker can observe these delays and guess—with a considerable probability—for which data flows the controller is invoked. In this way, the attacker may learn how the network is configured and how it operates. The leakage of this information may expose the network to a number of attacks, compromising its security. In more detail in a conventional software-defined network an attacker can measure several features like dispersion, round-trip times, etc. of packet forwarding by observing the network traffic. The attacker can thereby identify—with a very high probability—if the switches have matching flow rules installed for a network packet or if the switches interact with the controller for forwarding the packet. Currently, only prohibitive defenses against making such observations exist, e.g. sending all network packets to the controller or deleting and reinstalling flow rules at the switches. However, these conventional solutions add a significant workload to the controller and the installation of flow rules is a costly operation in terms of network resources, e.g. additional network traffic.

SUMMARY

In an embodiment, the present invention provides a method for forwarding data in form of flows in a network, wherein the network comprises one or more forwarding elements for forwarding data. The method includes forwarding, if the data matches a present forwarding rule on a first forwarding element, the data with a time delay according to a time delay policy and generated by a delay entity such that a first number of first packets of the data is forwarded by the first forwarding element with a first forwarding time delay, and a second number of second packets of the data with a second forwarding time delay. The first forwarding time delay and the second forwarding time delay have a certain time difference from each other.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
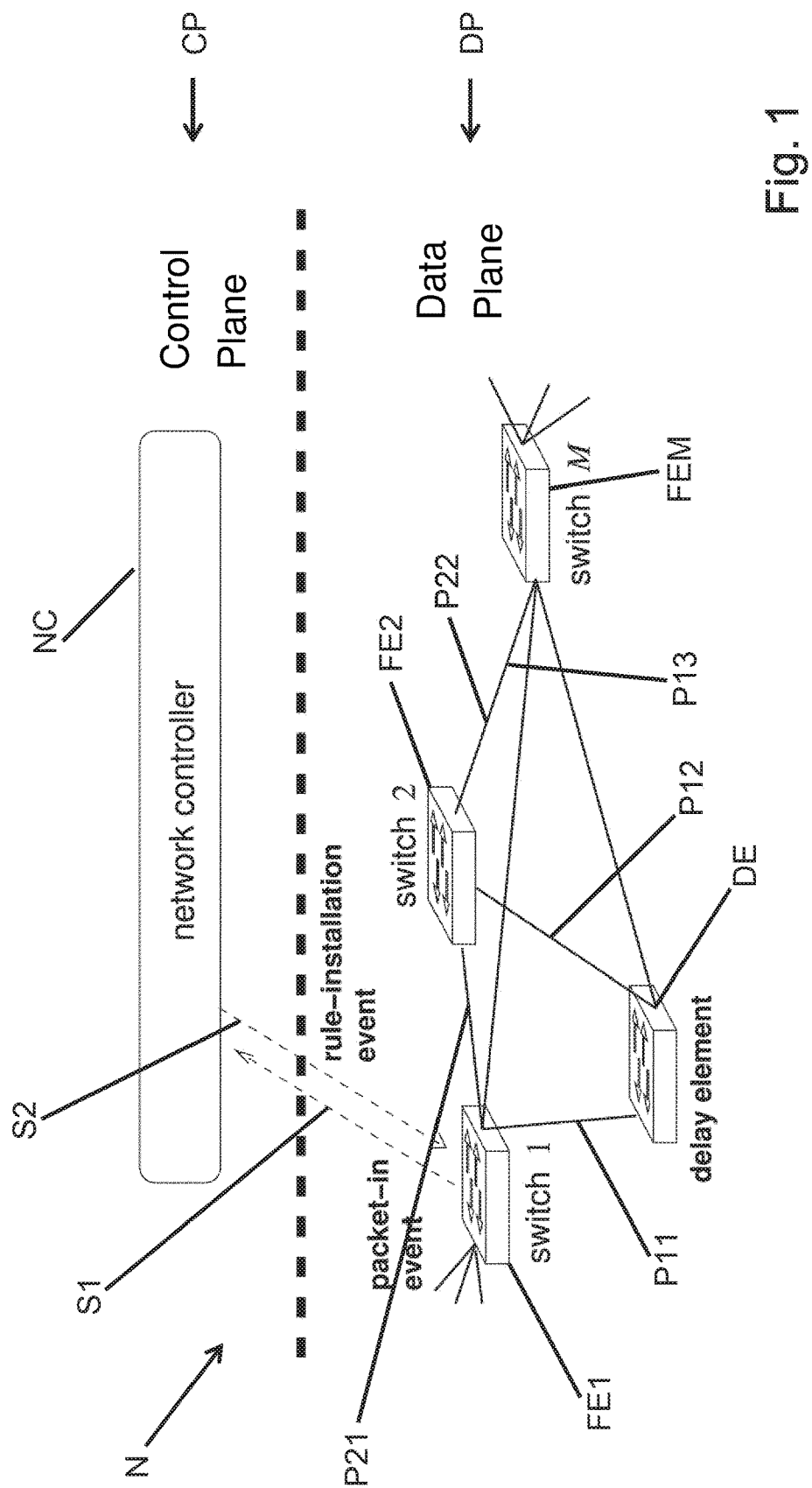
FIG. 1 shows a system according to a first embodiment of the present invention.

Although applicable to networks in general, the present invention will be described with regard to networks in form of software-defined networks.

Although applicable to data in general, the present invention will be described with regard to data in form of data flows.

Although applicable to any kind of forwarding element in, the present invention will be described with regard to forwarding elements in form of switches, in particular OpenFlow Switches.

Embodiments described herein provide a method for forwarding data, a forwarding element, and a network for forwarding data, which provide a higher level of security and are easy to implement while consuming only minor additional network resources.

A method is described herein for forwarding data, preferably data in form of flows, in a network, preferably a software-defined network, wherein the network comprises one or more forwarding elements for forwarding data.

Said method is characterized in that in case the data matches to a present forwarding rule on said forwarding element said data is forwarded with a time delay—delay forwarding—according to a time delay policy and generated by a delay entity such that a first number of packets—first packets—of said data is forwarded by said forwarding element with a first forwarding time delay and wherein a second number of packets—second packets—of the same data is forwarded with a second forwarding time delay, wherein the first forwarding time delay and the second forwarding time delay are having a certain time difference from each other.

A forwarding element is described herein for forwarding data, preferably data in form of flows, in a network, and connectable to a delay entity, preferably for performing with a method according to one of the claims.

Said forwarding element is characterized in that said forwarding element being adapted to send received data in case said data matches to a present forwarding rule on said forwarding element to said delay entity according to a time delay policy such that a first number of packets—first packets—of said data is forwarded with a first forwarding time delay and wherein a second number of packets—second packets—of the same data is forwarded with a second forwarding time delay, wherein the first forwarding time delay and the second forwarding time delay are having a certain time difference from each other.

A network is described herein, preferably a software-defined network, for forwarding data, preferably data in form of flows, in a network, wherein the network comprises one or more forwarding elements for forwarding data, preferably for performing with a method according to one of the claims.

Said network is characterized by a delay entity adapted to forward received data with a time delay—delay forwarding—and said forwarding element being adapted to send data in case said data matches to a present forwarding rule on said forwarding element to said delay entity according to a time delay policy such that a first number of packets—first packets—of said data is forwarded with a first forwarding time delay and wherein a second number of packets—second packets—of the same data is forwarded with a second forwarding time delay, wherein the first forwarding time delay and the second forwarding time delay are having a certain time difference from each other.

A rule or forwarding rule can comprise matching information and one or more actions to be performed when data or more specifically packets match to the matching information. One of the actions to be performed is then preferably specified as delay forwarding, such that upon matching delay forwarding is applied. The actions can be specified using a group table. A group table may comprise one or more action buckets. Each bucket may comprise one or more actions that are then applied to a packet.

A controller-forwarding element interaction for packet forwarding can be obfuscated by introducing delays in the forwarding of the first packets of a network flow without incurring considerable modifications to existing network elements, preferably in a software defined network. The controller-forwarding element interaction can be mimicked at the start of a network flow in the presence of a matching flow rule. Only minor additional network resources are consumed and the controller's packet-forwarding logic is not additionally complicated. Security can be significantly enhanced since delay forwarding of packets in networks, preferably software-defined networks, in which an attacker can measure several features like dispersion, round trip times, etc. of packet forwarding by observing the network traffic masks typical time patterns or mimics typical time patterns leading to a confusion of a potential attacker about the network configuration.

According to a preferred embodiment the first packets are beginning packets of said data and the second packets are the subsequent packets of said data preferably wherein the first number and/second number of packets is predetermined or fixed. This enables to confuse an attacker is a simple way.

According to a further preferred embodiment the first forwarding time delay is equal to a controlling time within a certain deviation interval, wherein the controlling time representing the time for generating and initially providing said present forwarding rule to said forwarding element. This enables in an easy way to mimic the installation of forwarding rules for said data even if no forwarding rule has to be installed. This further confuses a potential attacker when measuring time features of packet forwarding.

According to a further preferred embodiment first packets are forwarded via a different output port of said forwarding element than said second packets, wherein the delay entity is connected to the output port for the first packets. This enables an easy transmission to the delay entity for delaying the packets so that the forwarding element does not have to mimic the delay itself which packets are to be delay forwarded or not.

According to a further preferred embodiment when the time between subsequent packets exceeds a certain time threshold, then first packet exceeding said time threshold is considered as the first packet of a further first packets of a new data flow. This enhances further the security since additional delays for a data flow are introduced such that an adversary or attacker is further confused: When a data flow first arrives at a switch then the rule is installed causing a delay in forwarding the first packets. Further when packets of the same initial data flow are exceeding a certain time threshold between subsequent packets then a further delay is introduced to the packets mimicking an installation of a new forwarding rule and therefore causing an adversary to assume that the data flow has ended and that a new flow has arrived at the forwarding element.

According to a further preferred embodiment on only a subset of data arriving at said forwarding element, delay forwarding is applied. This enables to further enhance a confusion of an adversary.

According to a further preferred embodiment priority information assigned to said data is checked and said subset is excluded from delay forwarding when said priority information exceeds a predefined priority threshold. This enhances the flexibility since for example depending on specific implementation decisions some high-priority flows can be forwarded always without delay ensuring for example high quality of service QoS or quality of experience QoE.

According to a further preferred embodiment said subset of data is selected probabilistically. This further enhances the security such that an adversary cannot extract or guess any network modifications by measuring features of packet forwarding in the network.

According to a further preferred embodiment said delay entity is a) integrated into the forwarding element or b) located within the network outside the forwarding element, wherein in case of b) said forwarding element marks the data, preferably each packet, to be delayed with a delay indication for later evaluation by the delay entity. While a) enables a particular easy implementation within the forwarding element itself avoiding installation of a delay entity besides the forwarding element, b) enables an easy and flexible use of the delay element by further other forwarding elements avoiding costs for delay element for each forwarding element.

According to a further preferred embodiment the delay entity is emulated by a software-component on a corresponding network entity of the network, preferably wherein said network entity is provided in form of said forwarding element and/or a controller for controlling said forwarding element. This avoids the installation of further hardware and corresponding integration into the network. When the delay entity is emulated on the forwarding element or on a controller of a Software Defined Network, already present hardware can be used for providing the delay entity and thus delay forwarding.

According to a further preferred embodiment different packets belonging to the same data are forwarded by said forwarding element and/or said delay entity via different paths in said network. This further enables to defend against an adversary who is trying to measure the dispersion between back-to-back packets in order to estimate the capacity of network paths or to acquire statistics about delay paths in the network, for example by using standard deviation or the like.

According to a further preferred embodiment said forwarding via different paths is performed for load balancing with the network. This enables an optimization with regard to network resources and also further confusing an adversary.

According to a further preferred embodiment on at least part, preferably all packets of the data having the same or a similar header, delay forwarding is applied, wherein one or more parameters for headers are defined being evaluated when checking for a similarity. This even further enhances the security: An adversary may still learn whether the controller is installed in fine-grained rules or coarse-grained rules. This can be done for example if the adversary slightly changes the probe packet headers in order to see if additional delays are triggered. By delaying all packets whose headers are equal or marginally different the information leakage about the flow rule installation logic is therefore limited.

FIG. 1 shows a system according to a first embodiment of the present invention. In FIG. 1 a software-defined network N is shown with a control plane CP and a data plane DP. In the control plane a network controller NC is provided which is responsible for controlling switches FE1, FE2, FEM in the data plane DP. The switches FE1, FE2, FEM are connected with each other for forwarding packets of data. Further in the data plane DP a delay element DE is provided directly connected to forwarding element FE1 and FE2. Upon a packet-in event, i.e. upon arrival of a first packet of a data flow, the first switch FE1 communicates in a first step S1 with the network controller NC when no matching rule for said arriving data flow is present. The network controller NC then initiates rule-installation in a second step S2 on the switch FE1 such that the arrived packets of said data flow can be forwarded according to the installed and matched forwarding rule. To achieve delay of packets, a packet forwarding logic may be installed on the network switches FE1, FE2 . . . which selects different output ports for a flow depending on its status.

Preferably and in more detail a flow can be associated with one of two possible statuses: New, Old. All the flows that are in a "New" status are forwarded to said delay element DE, which mimics the delay introduced preferably by the handling of the packets at the controller CN. The switch then preferably applies this forwarding logic, per flow:

```
if (status = NEW):
    forward with additional delay;
else:
    (execute normal forwarding logic);
```

The checking "status=NEW" of a flow can be performed in different ways. One possible way is to check a flow timer, which tracks the time passed since the last packet belonging to the flow was received by the switch. If this time is above a given threshold, a newly received flow's packet can be considered as the start of a new flow, thus the flow status is set NEW. Instead, a flow status is set to OLD when a given number of packets has been received by the flow while staying in status NEW.

Applying the above definitions of NEW and OLD status, the previous forwarding logic would then look as follows:

```
Variable: counter;
if (last_packet_time > time_threshold or (counter > 0 and counter <=
num_packets)
): //status NEW
  forward with additional delay;
  counter = counter + 1;
else: //status OLD
  counter = 0;
  (execute normal forwarding logic);
```

Depending on the specific implementation decisions, either all or a subset of the flows can be handled with this logic. For instance, some high-priority flows may have packets always forwarded without delays. Likewise, it is possible to define just a subset of new flows to be delayed, for instance, using some probabilistic selection of the subset.

The delay element DE, which purpose is to introduce a delay which is preferably comparable with the one introduced by the controller interaction, can be implemented in different ways: For example a software switch can be used as a delay element DE for delaying the packets. The delay element DE can also be deployed in different ways:
  Integrated in the switch FE1, FE2, FEM itself. This can be achieved explicitly sending the packets to be delayed to e.g., the switch's slow path, or by queueing them in a slow output queue designed for the purpose;
  Connected to one of the switch's ports. The delay element DE is connected to a dedicated port of the switch FE1, FE2, FEM, where the packets are delivered when they need to be delayed;
  The delay element DE is deployed somewhere in the network N. The switch FE1, FE2, FEM tags the packets to which the delay has to be applied so that they are delivered eventually to the delay element DE.

To implement delay forwarding in switches FE1, FE2, . . . , a rule may be defined for which one of the actions to be performed when the rule is matched with "delay" routing these packets to the delay element DE prior to a further forwarding to the next forwarding element FE2, FEM or the like.

In more detail when the switch FE1, FE2, FEM is an OpenFlow switch said switch FE1, FE2, . . . may define a pipeline of flow tables to look up the actions that have to be applied to the packets of a given network flow.

The OpenFlow switch (e.g. the OpenFlow specification>1.3) defines a pipeline of flow tables to lookup the actions that have to be applied to the packets of a given network flow F. The actions can be specified using a group table. A group table may comprise one or more action buckets. Each bucket may comprise one or more actions that are then applied to a packet.

A group table is associated with a bucket selection logic, when the group table type is "select". In this embodiment it can be implemented as bucket selection logic. Assuming a group table like the following:

| Group number | Actions |
|---|---|
| 1 | Delay; Forward to port X |
| 2 | Forward to port X |

The bucket selection logic of the group table would be:

```
Variable: counter;
if (last_packet_time > time_threshold or (counter > 0 and counter <= num_packets)
): //status NEW
  select bucket 1
  counter = counter + 1;
else: //status OLD
  counter = 0;
  select bucket 2
```

For delaying the first few packets of a connection after selectively forwarding the first packets to a delay element DE a feedback loop between the controller C and the delay element DE may be established to ensure that packets are delayed according to a realistic delay distribution as dictated by the controller C.

Alternatively the delay element DE can be emulated by controller C itself

Further delay element DE can be deployed in the following way:
1. The delay element DE is emulated by the controller NC itself. Here, the action of Group 1 could be for example to forward the first few packets of a given connection to the controller NC.
2. The delay element DE is a dedicated software switch FE1, FE2, . . . that is part of the network N. This requires one to reserve one port of the OpenFlow switch FE1, FE2, . . . in order to set up the selective forwarding to the software switch FE1, FE2, . . . . Alternatively, one can tag packets and install a (non-OpenFlow) switch to selectively forward them either to another hardware OpenFlow switch FE1, FE2, . . . or to a software-based switch FE1, FE2, . . . .
3. The delay element DE can be emulated by the software component of the OpenFlow switches FE1, FE2, . . . .

The aforementioned group tables can not only be used in order to delay the first packets of a given connection but may also be used in order to selectively forward different packets of the same flow F across different redundant paths P11, P12, P13 or P21, P22 in the network N. This has the advantage that load balancing across different paths P11, P12, P13 or P21, P22 can be provided and further to defend against an adversary who is trying to measure the dispersion between back-to-back packets in order to estimate the capacity of the network paths P11, P12, P13 or P21, P22 respectively or to acquire statistics about the delay paths in the network N, for example by looking at the standard deviation.

However, an adversary may still learn that the controller NC is installing fine-grained rules or coarse-grained rules. An adversary can for example slightly change probe packet headers in order to see if additional delays are triggered. To prevent this information leakage a logic within group tables can be installed in order to preferably probabilistically, delay paths or all packets who's header are marginally different. As such the information leakage about the flow rule installation logic is limited.

Figure 2:
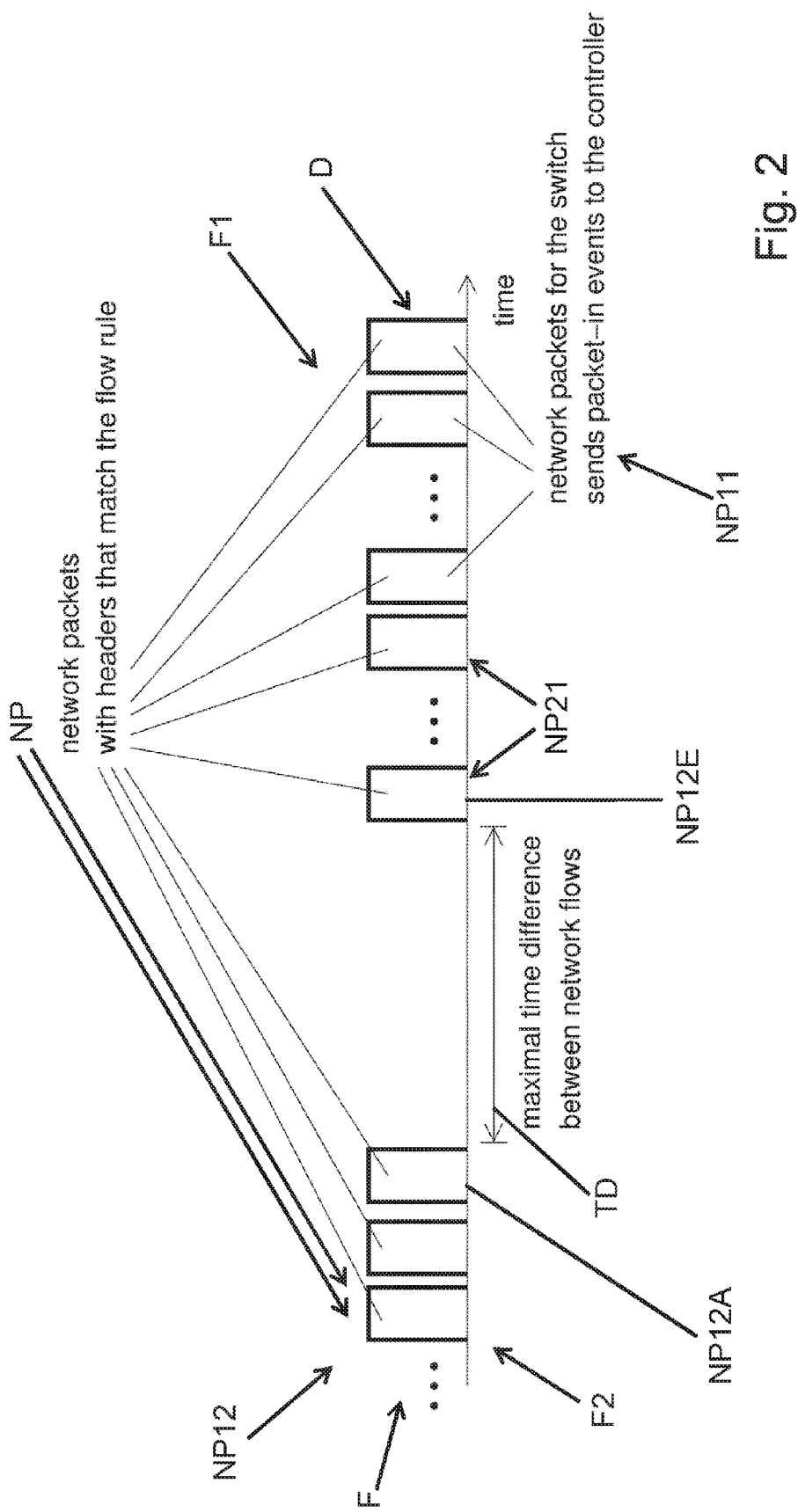
FIG. 2 shows a schematic view of delay forwarding of packets according to a second embodiment of the present invention.

FIG. 2 shows a schematic view of delay forwarding of packets according to a second embodiment of the present invention.

In FIG. 2 the time line t of subsequent packets NP, NP11, NP21, NP12 of a flow F of data D is shown. All the packets NP, NP11, NP21, NP12 shown in FIG. 2 are network packets NP with headers matching a flow rule. The network packets NP11 are the packets for which the switch FE1 sends packet-in events to the controller NC, whereas for the packets NP21 the switch FE1 does not send further packet in event for the controller NC. So the packets for which the switch FE1, FE2, FEM sends packet-in events to the controller NC are first packets NP11 and the subsequent packets are the second packets NP21. If the maximum time difference TD between subsequent packets NP21E and NP12A is greater than a predetermined time threshold, then the packets NP12A and the corresponding subsequent packets are to be recognized as "new" flow F2 compared to the prior "old" flow F1, whereby performing again delay forwarding with new first packets and new second packets of the now further flow F2.

An attacker can understand if a flow rule has been installed by observing the distribution of the forwarding delays for few packets at the start of a network flow. Assuming that the forwarding delay of each of the packets of a flow NP1, NP2, . . . , NPi is around a mean value FT1, and that the forwarding delay for the each of the subsequent packets of the same flow NPi+1, . . . , NPj is around a mean value FT2, if FT2<<FT1 the attacker can guess that a flow rule, for such flow, has been installed. In fact, in a reactive setup the first few packets of the flow are handled at the controller NC, while the subsequent ones are forwarded directly by a flow rule in the switch FE1, FE2, FEM. Instead, when a flow rule is already in place for a given flow, then FT1 will be very similar to FT2.

According to various embodiments of the present invention, internal times, internal counters, and group tables of flow switches can be leveraged in order to selectively forward certain packets of each flow. Further, various embodiments of the present invention enable selective forwarding of the first few packets per flow to a delay element in the network in order to emulate a controller-switch interaction. Even further, various embodiments of the present invention can enable selective forwarding of back-to-back packets of the same flow across multiple paths in order to prevent an external adversary to estimate the bandwidth capacity of the network.

A method according to an embodiment of the present invention comprises the following steps: When a new packet arrives at a forwarding element FE:

1. The forwarding element FE checks the packet header of the received packet to identify which flow it belongs to. If the flow rule is installed, the forwarding element FE looks up the corresponding group table to decide on the next action.
2. Depending on the time during which a packet from that specific flow was seen, and depending on the packet counter number, the switch chooses one pre-determined bucket from the group table.
3. The forwarding element FE forwards the packet according to the policy determined by the chosen bucket.
4. Depending on the policy, the forwarding element FE might forward the packet to a delay element.

If a forwarding element FE1, FE2, . . . receives a network packet for which it has to contact the controller NC, for example if no matching flow rule in the switches flow table is installed, it sends as usual a notification event to the controller NC.

Various embodiments of the present invention have, inter alia, the following advantages: a controller-switch interaction for packet forwarding can be obfuscated without incurring significant modifications in existing software-defined network elements. Only minor additional network resources are consumed and a controller's packet forwarding logic is not complicated. A mimicking can be enabled at the data plane of a controller-switch interaction at the start of a network flow in the presence of a matching flow rule.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for forwarding data in a network, wherein the network comprises a forwarding element for forwarding the data, the method comprising:
   receiving packets of the data that correspond to a present forwarding rule of the forwarding element;
   forwarding the received packets with an added time delay, the added time delay comprising a first forwarding time delay and a second forwarding time delay,
   wherein a first number of the received packets of the data, which are first packets, are forwarded by the first forwarding element with the first forwarding time delay,
   wherein a second number of the received packets of the data, which are second packets, are forwarded with the second forwarding time delay, and
   wherein the first forwarding time delay and the second forwarding time delay have a time difference from each other.

2. The method according to claim 1, wherein the first packets are beginning packets of the received packets and the second packets are subsequent packets of the received packets.

3. The method according to claim 1, wherein the first forwarding time delay is equal to a controlling time within a deviation interval, wherein the controlling time represents a time for generating and initially providing the present forwarding rule to the forwarding element.

4. The method according to claim 1,
   wherein the first packets are forwarded via a first output port of the forwarding element and the second packets are forwarded via a second output port of the forwarding element, and
   wherein a delay entity is connected to the first output port and implements at least a portion of the first forwarding time delay.

5. The method according to claim 1, wherein when a time between the forwarding element receiving the received packets and receiving subsequent packets of the data exceeds a time threshold, then initial packets of the subsequent packets are first packets of a new data flow, and wherein the received packets correspond to a prior data flow.

6. The method according to claim 1, wherein the forwarding element only applies the added time delay to a subset of the data arriving at the forwarding element.

7. The method according to claim 6, the method comprising:
   checking whether priority information assigned to the received packets of the data exceeds a predefined priority threshold to determine which of the received packets are high priority packets, and
   forwarding the high priority packets without the added time delay.

8. The method according to claim 6, wherein the subset of the data is selected based on a probability distribution.

9. The method according to claim 1, wherein the network comprises a delay entity that implements at least a portion of the added time delay and that is:
   a) integrated into the forwarding element, or
   b) located within the network outside of the forwarding element, wherein the forwarding element marks each packet of the data to be delayed with a delay indication for later evaluation by the delay entity.

10. The method according to claim 9, wherein the delay entity is emulated by a software-component on a corresponding network entity of the network, wherein the network entity is at least one of the forwarding element or a controller for controlling the forwarding element.

11. The method according to claim 1, wherein different packets belonging to the data are forwarded by at least one of the forwarding element or a delay entity via different paths in the network.

12. The method according to claim 11, wherein the forwarding via different paths is performed for load balancing within the network.

13. The method according to claim 1, the method comprising:
- forwarding, with the added time delay, at least some packets of the data that have a same header or a similar header as a packet of the data that has a header that corresponds to the present forwarding rule,
- wherein determining whether the packets have the same or the similar header is based on one or more defined parameters.

14. A forwarding element for forwarding data in a network, the forwarding element being connectable to a delay entity, the forwarding element being configured to:
- forward received data that corresponds to a present forwarding rule of the forwarding element to the delay entity whereby a first number of packets of the received data, which are first packets, are forwarded with a first forwarding time delay added and a second number of the packets of the received data are forwarded with a second forwarding time delay added,
- wherein the first forwarding time delay and the second forwarding time delay have a time difference from each other.

15. A network for forwarding data, the network comprising:
- a forwarding element for forwarding the data according to one or more rules, and
- a delay entity configured to forward received data with an added time delay,
- wherein the forwarding element is configured to send the received data that corresponds to a present forwarding rule of the forwarding element to the delay entity whereby:
    - a first number of packets of the received data is forwarded with a first forwarding time delay, and
    - a second number of the packets of the received data is forwarded with a second forwarding time delay, and
- wherein the first forwarding time delay and the second forwarding time delay have a time difference from each other.

* * * * *